US012137064B2

(12) United States Patent
Tablewski et al.

(10) Patent No.: US 12,137,064 B2
(45) Date of Patent: Nov. 5, 2024

(54) COMMUNICATION TERMINAL FOR ADDRESSED MESSAGING WITHIN AN AUTOMATED IDENTIFICATION SYSTEM ARRANGEMENT USING AID TO NAVIGATION TRANSPONDER

(71) Applicant: The United States of America, as represented by the Secretary of the Navy, San Diego, CA (US)

(72) Inventors: Lynne A. Tablewski, San Diego, CA (US); John Clark Stastny, San Diego, CA (US); Sparta Cheung, San Diego, CA (US); Vladimir Y. Matveyev, San Diego, CA (US); Bryan David Bagnall, Menlo Park, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 294 days.

(21) Appl. No.: 17/894,987

(22) Filed: Aug. 24, 2022

(65) Prior Publication Data

US 2024/0063960 A1    Feb. 22, 2024

Related U.S. Application Data

(60) Provisional application No. 63/399,447, filed on Aug. 19, 2022.

(51) Int. Cl.
*H04L 5/00* (2006.01)
*H04L 9/40* (2022.01)
*H04K 1/00* (2006.01)

(52) U.S. Cl.
CPC .......... *H04L 5/0044* (2013.01); *H04L 5/0055* (2013.01); *H04L 63/1475* (2013.01); *H04K 1/00* (2013.01)

(58) Field of Classification Search
CPC . H04L 5/0044; H04L 5/0055; H04L 63/1475; H04K 1/00
See application file for complete search history.

(56) References Cited

U.S. PATENT DOCUMENTS

| 5,506,587 A | 4/1996 | Lans |
| 7,111,044 B2 | 9/2006 | Lee |
| 2024/0302170 A1* | 9/2024 | Davies ................ G01C 21/203 |

OTHER PUBLICATIONS

Recommendation ITU-R M. 1371-5 (Feb. 2014), Technical characteristics for an automatic identification system using time division multiple access in the VHF maritime mobile frequency band, Posted Nov. 27, 2014, retrieved from internet <https://www.itu.int/rec/R-REC-M.1371-5-201402-I/en>.

* cited by examiner

*Primary Examiner* — Sulaiman Nooristany
(74) *Attorney, Agent, or Firm* — Naval Information Warfare Center; Kyle Eppele; James R. McGee

(57) ABSTRACT

A communication terminal for addressed messaging within an Automated Identification System (AIS) arrangement includes a user interface and an Aid to Navigation (AtoN) transponder. The user interface facilitates the addressed messaging, which includes one or more of: chat messaging addressed between the communication terminal and a participant terminal of the AIS arrangement, automatic position messaging addressed from the communication terminal to a monitoring terminal of the AIS arrangement, or situational report messaging addressed from the communication terminal to a situational awareness terminal of the AIS arrangement. The AtoN transponder of the communication terminal of the AIS arrangement is coupled to the user interface for transmitting and receiving that achieves the addressed messaging. For the situational report messaging, the situational awareness terminal reformats and exchanges the addressed (Continued)

messaging with a web-based situational awareness tool via the internet.

19 Claims, 5 Drawing Sheets

COMMUNICATION TERMINAL FOR ADDRESSED MESSAGING WITHIN AN AUTOMATED IDENTIFICATION SYSTEM ARRANGEMENT USING AID TO NAVIGATION TRANSPONDER

CROSS-REFERENCE TO RELATED APPLICATION

This application claims benefit of U.S. Provisional Application No. 63/399,447, filed Aug. 19, 2022, titled "Addressed Messaging within an Automated Identification System," which provisional application is incorporated by reference in its entirety.

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 210898.

BACKGROUND OF THE INVENTION

Maritime vessels typically communicate amongst themselves and with ashore port authorities with voice transmissions over very high frequency (VHF) radio. However, such radio communications are typically limited to line of sight communication and voice transmission are difficult when the parties do not speak the same language. There is a general need to overcome such problems.

SUMMARY

A communication terminal for addressed messaging within an Automated Identification System (AIS) arrangement includes a user interface and an Aid to Navigation (AtoN) transponder. The user interface facilitates the addressed messaging, which includes one or more of: chat messaging addressed between the communication terminal and a participant terminal of the AIS arrangement, automatic position messaging addressed from the communication terminal to a monitoring terminal of the AIS arrangement, or situational report messaging addressed from the communication terminal to a situational awareness terminal of the AIS arrangement. The AtoN transponder of the communication terminal of the AIS arrangement is coupled to the user interface for transmitting and receiving that achieves the addressed messaging. For the situational report messaging, the situational awareness terminal reformats and exchanges the addressed messaging with a web-based situational awareness tool via the internet.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The inventors have discovered that voice transmissions can be supplemented with addressed textual messaging integrated into an Automated Identification System (AIS). To overcome limitations on the light of sight, unacknowledged textual messages between two terminals are repeated until the two terminals come back into range of each other. The addressed textual messaging includes chat messaging, automatic position messaging, and situational report messaging that are optionally encrypted to inhibit eavesdropping. Voice transmissions can be supplemented with chat textual messaging more readily understood when the parties do not speak the same language. A maritime operations center can track fleet vessels using the automatic position messaging encrypted to not provide tracking information to other vessels. The chat messaging, the automatic position messaging, and especially the situational report messaging can be reformatted at each maritime operations center and forwarded over the internet to provide global situational awareness in a web-based situational awareness tool.

Figure 1:
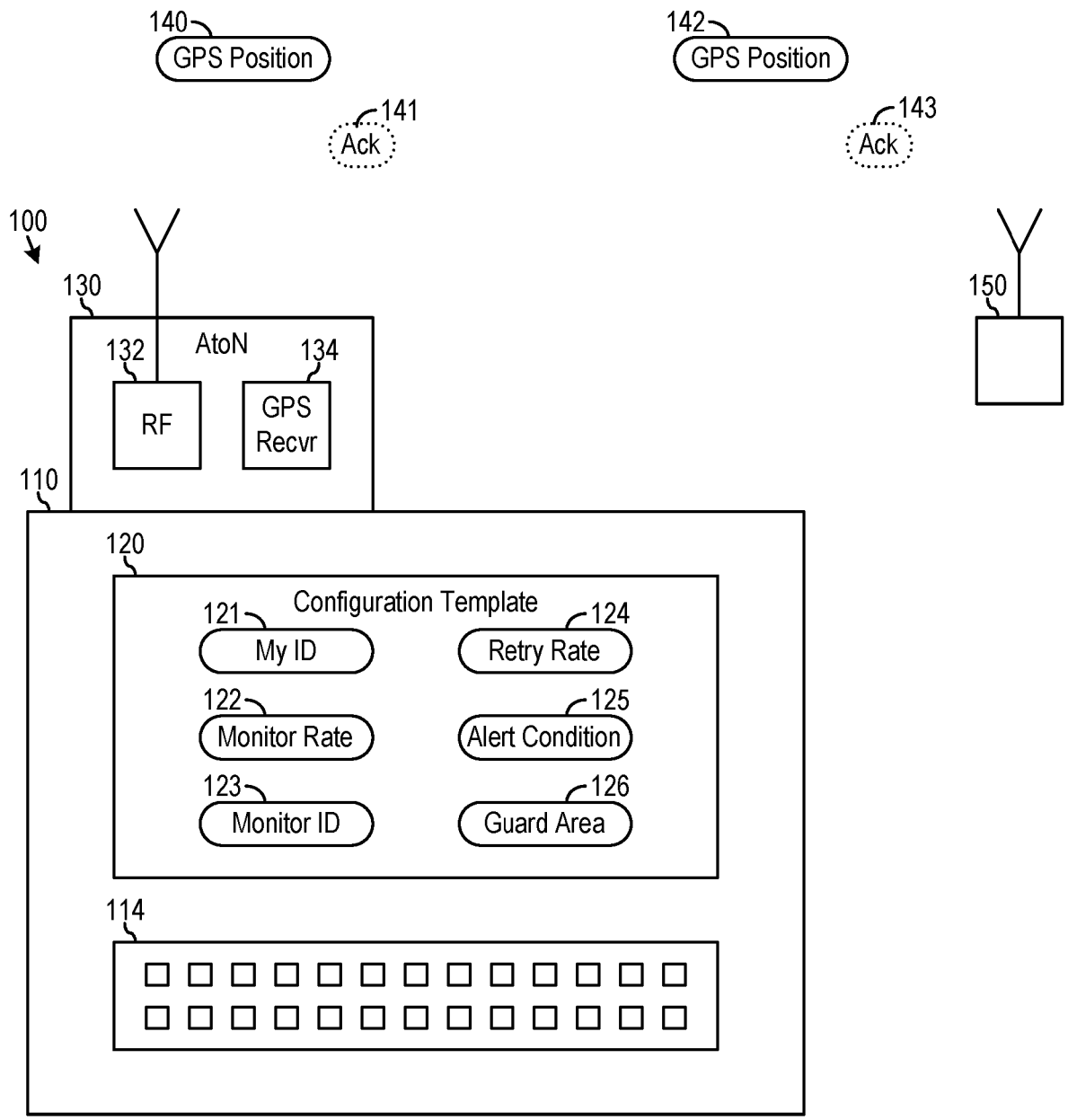
FIG. 1 is a block diagram illustrating a configuration template of a user interface of a communication terminal for addressed messaging within an Automated Identification System (AIS) arrangement in accordance with an embodiment of the invention.

FIG. 1 is a block diagram illustrating a configuration template 120 of a user interface 110 of a communication terminal 100 for addressed messaging within an Automated Identification System (AIS) arrangement in accordance with an embodiment of the invention. The communication terminal 100 includes the user interface 110 and an Aid to Navigation (AtoN) transponder 130.

The AtoN transponder 130 of the AIS arrangement is coupled to the user interface 110 for transmitting and receiving that achieves the addressed messaging. The AtoN transponder 130 includes a radio frequency transceiver 132 for transmitting outgoing messages of the addressed messaging including messages 140 and 142, and for receiving both incoming messages of the addressed messaging and broadcast messages, with the outgoing messages addressed from the communication terminal 100 and with the incoming messages addressed to the communication terminal 100. The AtoN transponder 130 also includes a Global Positioning System (GPS) receiver 134 for measuring a GPS position of the AtoN transponder 130.

The user interface 110 facilitates the addressed messaging, which includes automatic position messaging addressed from the communication terminal 100 to a monitoring terminal 150 of the AIS arrangement. The user interface 110 displays the configuration template 120 and includes a keyboard 114 for accepting user input that sets configuration parameters within the configuration template 120. Keyboard 114 is a touchscreen or other virtual keyboard in an embodiment of the invention.

The configuration template 120 sets a respective identifier 121 of the communication terminal 100. In one embodiment, the respective identifier assigned to each of the terminals 100 and 150 is a Maritime Mobile Service Identity (MMSI) of the Automated Identification System (AIS), with the MMSI that is assigned to the communication terminal 100 stored in non-transitory memory of the communication terminal 100. The stored MMSI uniquely identifies the AtoN transponder 130 of the communication terminal 100.

The configuration template 120 sets a delivery rate 122 and a respective identifier 123 of the monitoring terminal 150 for the automatic position messaging. The respective identifier 123 is optionally a group identifier identifying a group of terminals including the monitoring terminal 150. After initialization of the respective identifier 121 of the communication terminal 100, the delivery rate 122, and the respective identifier 123 of the monitoring terminal 150, the communication terminal 100 begins the automatic position messaging.

For the automatic position messaging, the communication terminal 100 formats outgoing position messages 140 and 142, each including the respective identifier 121 of the communication terminal 100, the respective identifier 123 of the monitoring terminal 150, and a current GPS position of the AtoN transponder 130 from the GPS receiver 134. The AtoN transponder 130 then transmits the outgoing position messages 140 and 142 of the automatic position messaging of the addressed messaging. A time interval between the outgoing position messages 140 and 142 is set with the delivery rate 122. Typically, because the outgoing position messages 140 and 142 are addressed messaging, the addressed monitoring terminal 150 transmits respective acknowledgements 141 and 143 of receipt of the position messages 140 and 142.

The configuration template 120 also sets a retry rate 124 for the chat messaging and the situational report messaging further discussed below. The configuration template 120 further specifies an alert condition 125 and a specified guard area 126. Examples for alert condition 125 include a current GPS position of the AtoN transponder 130 of the communication terminal 100 entering into the specified guard area 126, or a current remote GPS position of an AIS transponder of a remote terminal 150 entering into the specified guard area 126.

Figure 2:
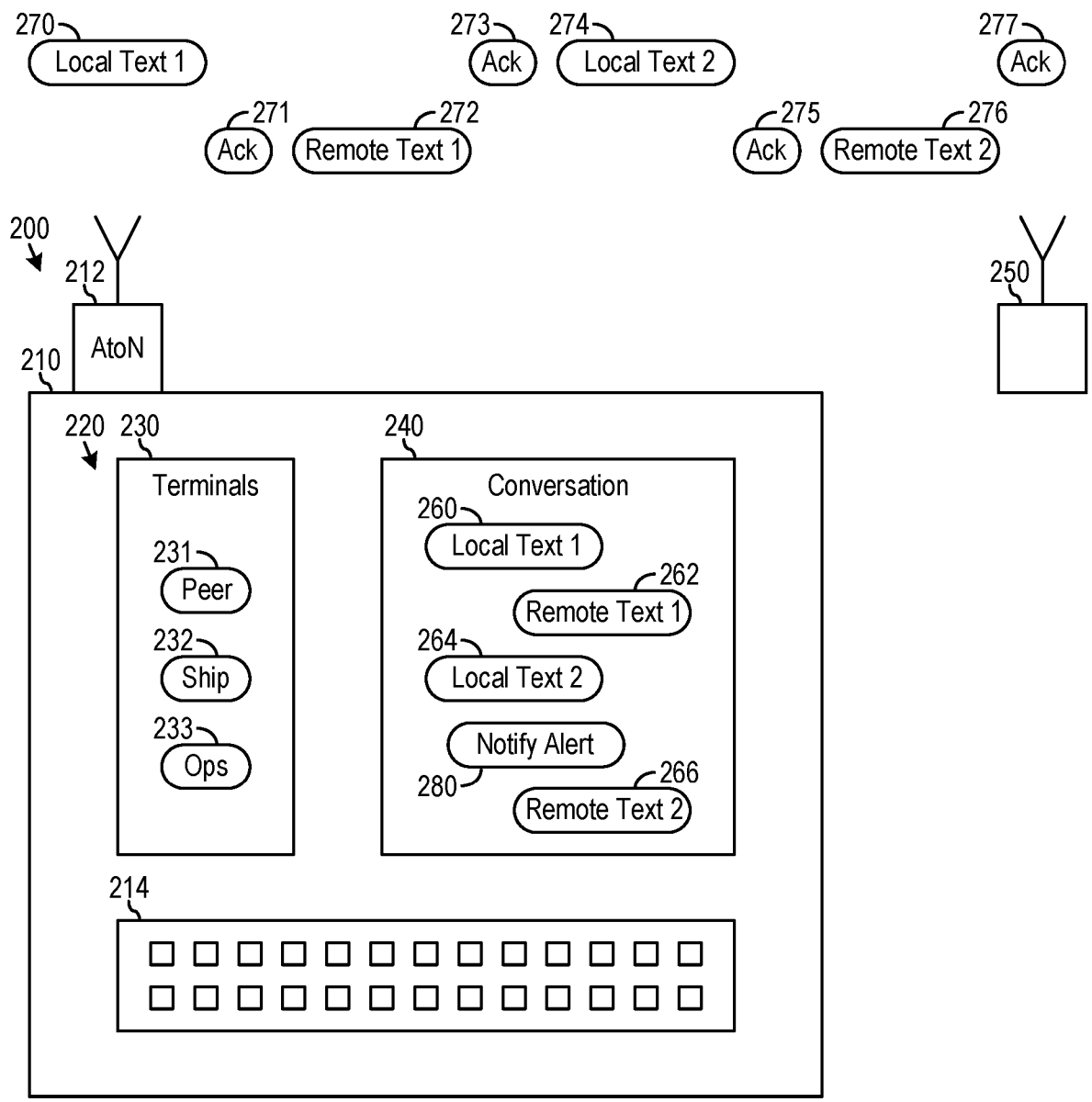
FIG. 2 is a block diagram illustrating a chat view of a user interface of a communication terminal for addressed messaging within an Automated Identification System (AIS) arrangement in accordance with an embodiment of the invention.

FIG. 2 is a block diagram illustrating a chat view 220 of a user interface 210 of a communication terminal 200 for addressed messaging within an Automated Identification System (AIS) arrangement in accordance with an embodiment of the invention.

The communication terminal 200 includes the user interface 210 and an AtoN transponder 212. The user interface 210 facilitates the addressed messaging, which includes chat messaging addressed between the communication terminal 200 and a participant terminal 250 of the AIS arrangement. The AtoN transponder 212 of the AIS arrangement is coupled to the user interface 210 for transmitting and receiving that achieves the addressed messaging.

The user interface 210 includes a keyboard 214 and a display. The keyboard 214 accepts outgoing texts 260 and 264 of those of the outgoing messages 270 and 274 for the chat messaging of the addressed messaging. The display shows the chat view 220 including a listing 230 of known terminals. The display also shows a conversation 240 temporally interleaving the outgoing texts 260 and 264 and incoming texts 262 and 266 from those of the incoming messages 272 and 276 for the chat messaging of the addressed messaging.

The chat view 220 enables selecting the participant terminal 250 from the listing 230 of known terminals in the AIS arrangement. The listing 230 of known terminals lists, for example, a peer terminal 231 with an AtoN transponder, a ship terminal 232 with a full-function AIS transponder, and a situational awareness terminal 233 with a full-function AIS transponder providing a gateway to a web-based situational awareness tool. Depending upon user input at keyboard 214, the participant terminal 250 for the chat messaging is selected to be any of the terminals 231, 232, or 233. It will be appreciated that the listing 230 is dynamically updated as terminals come into and pass out of range of the AtoN transponder 212, and that the user interface 210 supports direct entry from keyboard 214 of the name and the respective identifier of a terminal not already included in the listing 230.

The Automated Identification System (AIS) preferably supports collision avoidance. By default, each full-function AIS transponder periodically broadcasts the GPS position of the full-function AIS transponder so other terminals within range can compare GPS positions and detect impending collision. An AtoN transponder is an AIS transponder, but is not a full-function AIS transponder.

In one embodiment, the AIS complies with a standard denoted Recommendation ITU-R M.1371-5 (02/2014), Technical characteristics for an automatic identification system using time division multiple access in the VHF maritime mobile frequency band. According to this standard, a full-function AIS transponder broadcasts GPS position using message types 1, 2, or 3. According to this standard, an Aid to Navigation (AtoN) transponder broadcasts using message types 8 and 21, and transmits addressed messaging using message type 6.

However, as used in herein in the specification and claims, an AtoN transponder is configured to not broadcast messages. Note that an AtoN transponder could be a full-function AIS transponder particularly configured to not broadcast messages. Thus, for an AtoN transponder that complies with the standard of Recommendation ITU-R M.1371-5 (02/2014), the AtoN transponder does not transmit message types 1, 2, 3, 8 and 21 of the standard, but only transmits addressed messaging using message type 6 of the standard. In general regardless of standard compliance, an AtoN transponder as used herein in the specification and claims is defined as not broadcasting messages, but only transmitting addressed messaging. Note that an AtoN transponder as used herein in the specification and claims does receive broadcast messages.

In one embodiment, the AtoN transponder 212 is configured for transmitting only outgoing addressed messages (e.g. 270 and 274) and outgoing addressed acknowledgements (e.g. 273 and 277) of the incoming addressed messages (e.g.

272 and 276), such that the AtoN transponder 212 is configured not to transmit any broadcast messages.

A reason for the AtoN transponder 212 not transmitting any broadcast messages is to inhibit eavesdropping on the addressed messaging including the chat messaging of FIG. 2, the automatic position messaging including current GPS position of FIG. 1, and the situational report messaging of FIG. 3 discussed below. Instead in one embodiment, such addressed messaging utilizes addressed messages with a data payload encrypted to inhibit eavesdropping on the chat messaging, the automatic position messaging, and the situational report messaging. Note that the addressed messaging is actually received by any nearby AIS transponder, but such an AIS transponder filters out the addressed messaging unless the respective identifier of the AIS transponder is included as the destination terminal of the addressed messaging.

As used in herein in the specification and claims, addressed messaging is defined as messages that include a destination of limited scope within each of the messages. For example, the messages 270 and 274 of the chat messaging of the addressed messaging each include the respective identifier of the participant terminal 250 as the destination terminal. As used in herein in the specification and claims, addressed messaging is defined not to include any broadcast messages.

Again, the conversation 240 temporally interleaves the outgoing texts 260 and 264 to the participant terminal 250 and incoming texts 262 and 266 of the incoming chat messages 272 and 276 for the chat messaging of the addressed messaging.

The communication terminal 200 formats the outgoing chat messages 270 and 274 addressed to the participant terminal 250. Respective outgoing chat messages 270 and 274 for the outgoing texts 260 and 264 include the respective identifier of the communication terminal 200, the respective identifier of the participant terminal 250, and the appropriate outgoing text.

The communication terminal 200 requests that the AtoN transponder 212 transmit each outgoing chat message 270 and 274. In one embodiment, the participant terminal 250 confirms successful receipt of chat message 270 with acknowledgement 271, and confirms successful receipt of chat message 274 with acknowledgement 275. However, factors such as electromagnetic noise or the communication terminal 200 and the participant terminal 250 traveling out of range from each other might prevent successful receipt of the chat message 270. In this event not shown in FIG. 2, the communication terminal 200 repeatedly requests that the AtoN transponder 212 transmit the outgoing chat message 270 at the configured retry rate 124 of FIG. 1 until an incoming acknowledgement 271 for the outgoing chat message 270 of the chat messaging of the addressed messaging. The retries ensure delivery despite temporary electromagnetic noise or temporary interruption of communications range. Transfer of the chat message 270 completes upon the communication terminal 200 accepting receipt at the AtoN transponder 212 of the incoming acknowledgement 271 addressed from the participant terminal 250 to the communication terminal 200.

The communication terminal 200 also accepts receipt at the AtoN transponder 212 of each of the incoming chat messages 272 and 276 addressed from the participant terminal 250 to the communication terminal 200. The communication terminal 200 extracts from each of the incoming chat messages 272 and 276 the respective identifier of the participant terminal 250 and a respective one of the incoming texts 262 and 266.

Figure 3:
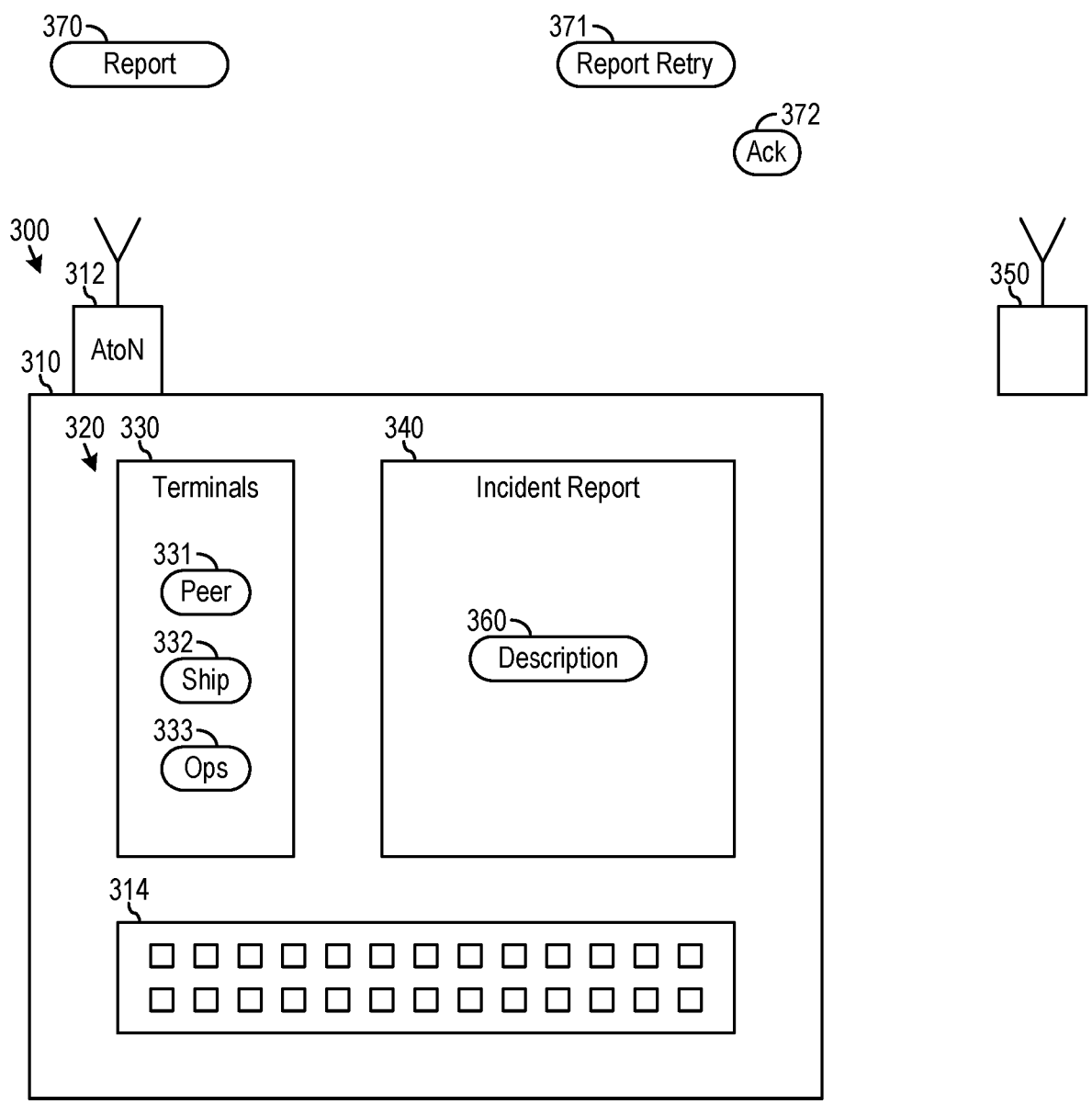
FIG. 3 is a block diagram illustrating a report view of a user interface of a communication terminal for addressed messaging within an Automated Identification System (AIS) arrangement in accordance with an embodiment of the invention.

FIG. 3 is a block diagram illustrating a report view 320 of a user interface 310 of a communication terminal 300 for addressed messaging within an Automated Identification System (AIS) arrangement in accordance with an embodiment of the invention.

The report view 320 is displayed at the user interface 310. The report view 320 displays a listing 330 of known terminals 331, 332, and 333 and an incident report 340. The report view 320 enables setting a respective identifier of the situational awareness terminal 350 from the listing 330 of known terminals upon a user selecting the situational awareness terminal 333 from the listing 330. The report view 320 shows an incident report 340 during user entry at keyboard 314 of a description 360 of the incident report 340. An example of a description 360 of the incident report 340 is a notification of a vessel needing assistance as observed by a user of the communication terminal 300.

The communication terminal 300 formats a situational report message 370 addressed to the situational awareness terminal 350. The situational report message 370 includes the respective identifier of the communication terminal 300, the respective identifier of the situational awareness terminal 350, and the incident report description 360.

The communication terminal 300 repeatedly requests that the AtoN transponder 312 transmit the situational report message 370 of the situational report messaging of the addressed messaging until a report acknowledgement for the situational report message 370. Due to temporary disruption from electromagnetic noise or from terminals 300 and 350 passing out of communications range from each other, the situational awareness terminal 350 does not successfully receive the situational report message 370 in the example shown in FIG. 3. Because the situational awareness terminal 350 does not successfully receive the situational report message 370, the situational awareness terminal 350 does not transmit a report acknowledgement for the situational report message 370.

Because the communication terminal 300 receives no report acknowledgement for the situational report message 370, the communication terminal 300 requests that the AtoN transponder 312 repeat transmission with the situational report message 371 of the situational report messaging. A time interval between the situational report messages 370 and 371 is set with the retry rate 124 of FIG. 1. Transfer of the situational report message 371 completes upon the communication terminal 300 accepting receipt at the AtoN transponder 312 of the report acknowledgement 372 addressed from the situational awareness terminal 350 to the communication terminal 300.

In one embodiment, the situational awareness terminal 350 of FIG. 3 is also the participant terminal 250 of the chat messaging of FIG. 2 and the monitoring terminal 150 of the automatic position messaging of FIG. 1. In this embodiment, the communication terminals 100, 200, 300 might also be the same nearby terminal. Thus, a user at the situational awareness terminal 350 receives the GPS position of this nearby terminal in the automatic position messaging of FIG. 1, and receives any incident report submitted from this nearby terminal in the situational report messaging of FIG. 3. Further, the user at the situational awareness terminal 350 can, for example, initiate the chat messaging of FIG. 2 to seek clarification of the submitted incident report. Thus, the addressed messaging includes all of the chat messaging of FIG. 2, the automatic position messaging of FIG. 1, and the situational report messaging of FIG. 3.

However, the addressed messaging does not include any broadcast messages. Thus, the AtoN transponder of this nearby terminal is configured for transmitting each of the outgoing chat messages including chat messages 270 and 274 of the chat messaging of FIG. 2, transmitting each outgoing acknowledgement including outgoing acknowledgements 273 and 277 for the incoming chat messages 272 and 276 of the chat messaging of FIG. 2, at the delivery rate transmitting each outgoing position message including position messages 140 and 142 of the automatic position messaging of FIG. 1, and transmitting each situational report message 370 and 371 of the situational report messaging of FIG. 3, but the AtoN transponder of this nearby terminal is configured to transmit nothing else.

Generally, the AIS arrangement includes terminals each assigned a respective identifier. The terminals include each communication terminal 100, 200, and 300 of FIGS. 1-3, the participant terminal 250 of FIG. 2, the monitoring terminal 150 of FIG. 1, and the situational awareness terminal 350 of FIG. 3. The addressed messaging includes outgoing messages 140, 142, 270, 274, 370, and 371 of FIGS. 1-3 each addressed from the appropriate communication terminal 100, 200, or 300 to one of the destination terminals 150, 250, and 350. The addressed messaging also includes incoming messages 272 and 276 of FIG. 2 addressed from a source terminal 250 to the communication terminal 200. Each of the outgoing messages 140, 142, 270, 274, 370, and 371 of FIGS. 1-3 include the respective identifier of the appropriate communication terminal 100, 200, or 300 and the respective identifier of the appropriate destination terminal 150, 250, or 350, and each of the incoming messages 272 and 276 of FIG. 2 includes the respective identifier of the appropriate source terminal 250 and the respective identifier of the appropriate communication terminal 200.

Figure 4:
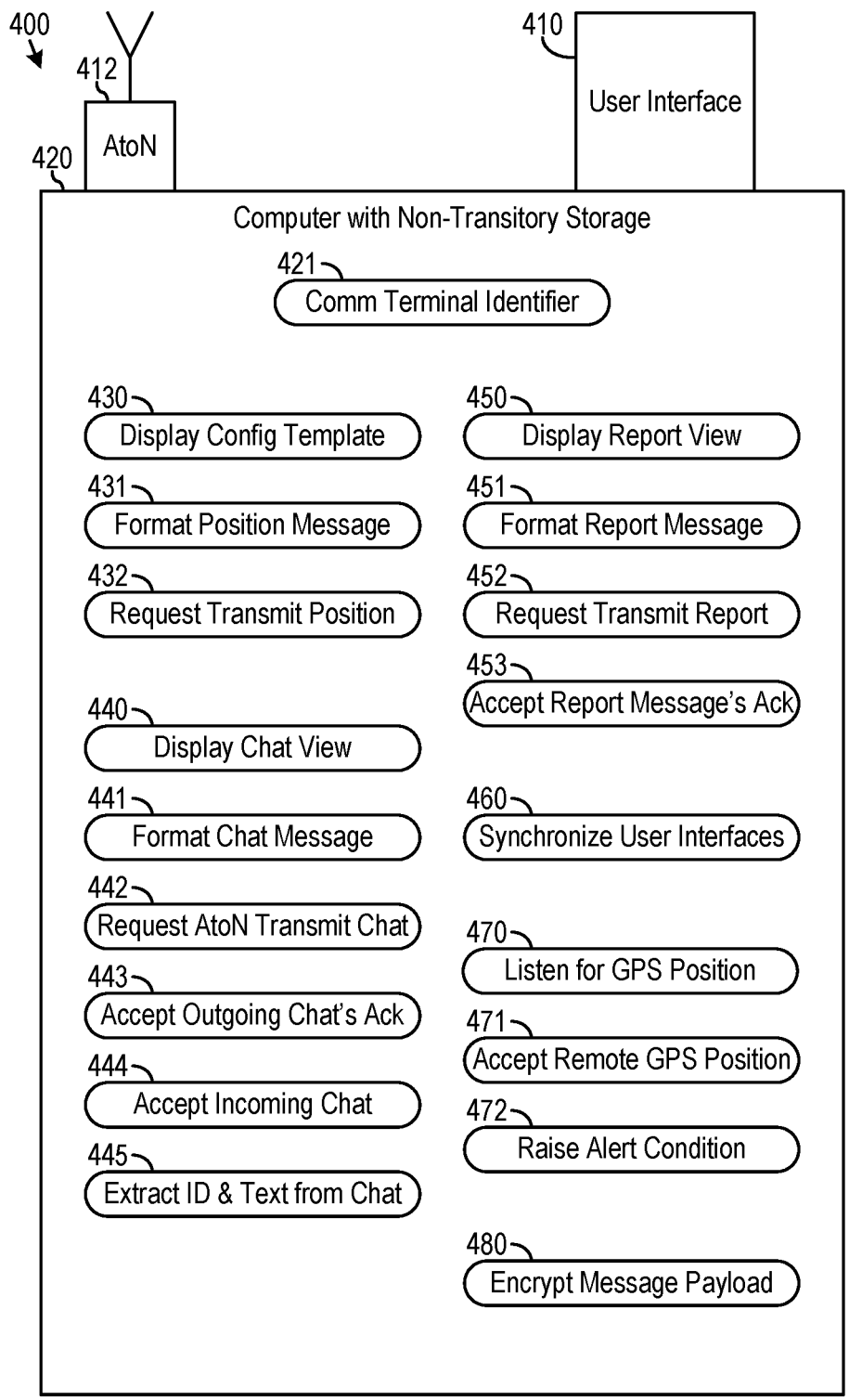
FIG. 4 is a block diagram illustrating a computer of a communication terminal for addressed messaging within an Automated Identification System (AIS) arrangement in accordance with an embodiment of the invention.

FIG. 4 is a block diagram illustrating a computer 420 of a communication terminal 400 for addressed messaging within an Automated Identification System (AIS) arrangement in accordance with an embodiment of the invention. The computer 420 is coupled to the AtoN transponder 412 and supports the user interface 410.

The computer 420 of the communication terminal 400 includes non-transitory memory storing the respective identifier 421 assigned to the communication terminal 400. In one embodiment, the respective identifier 421 is a Maritime Mobile Service Identity (MMSI) of the Automated Identification System (AIS). In another embodiment, the respective identifier 421 assigned to the communication terminal 400 is instead stored in non-transitory memory within the AtoN transponder 412.

The computer 420 is programmed to display 430 a configuration template of the communication terminal 400 at the user interface 410. The configuration template is for setting a respective identifier 421 of the communication terminal 400, for setting a delivery rate and a respective identifier of the monitoring terminal for the automatic position messaging, and for setting a retry rate for the chat messaging and the situational report messaging. The configuration template is also for specifying an alert condition and a specified guard area. The alert condition is, for example, a current local Global Positioning System (GPS) position of the AtoN transponder 412 of the communication terminal 400 entering into the specified guard area or a current remote GPS position of an AIS transponder of a remote terminal entering into the specified guard area. The computer 420 is programmed to format 431, at the delivery rate, an outgoing position message including the respective identifier 421 of the communication terminal 400, the respective identifier of the monitoring terminal, and a current Global Positioning System (GPS) position received from the AtoN transponder 412. The computer 420 is programmed to request 432, at the delivery rate, that the AtoN transponder 412 transmit the outgoing position message of the automatic position messaging of the addressed messaging.

The computer 420 is programmed to display 440 a chat view at the user interface 410. The chat view is for selecting the participant terminal from known terminals in the AIS arrangement, and for showing a conversation temporally interleaving outgoing texts to the participant terminal and incoming texts of incoming chat messages of the chat messaging of the addressed messaging. The computer 420 is programmed to format 441 outgoing chat messages addressed to the participant terminal. A respective one of the outgoing chat messages for each outgoing text includes the respective identifier 421 of the communication terminal 400, a respective identifier of the participant terminal, and the outgoing text. The computer 420 is programmed to repeatedly request 442 at the retry rate that the AtoN transponder 412 transmit each outgoing chat message until an incoming acknowledgement for the outgoing chat message of the chat messaging of the addressed messaging. The computer 420 is programmed to accept receipt 443 from the AtoN transponder 412 of the incoming acknowledgement addressed from the participant terminal to the communication terminal 400.

The computer 420 is further programmed to accept receipt 444 from the AtoN transponder 412 of each of the incoming chat messages addressed from the participant terminal to the communication terminal 400. The computer 420 is programmed to extract 445 from each of the incoming chat messages the respective identifier of the participant terminal and a respective one of the incoming texts.

The computer 420 is programmed to display 450 a report view at the user interface. The report view is for setting a respective identifier of the situational awareness terminal, and for showing an incident report description during user entry of the incident report description. The computer 420 is programmed to format 451 a situational report message addressed to the situational awareness terminal. The situational report message includes the respective identifier 421 of the communication terminal 400, the respective identifier of the situational awareness terminal, and the incident report description. The computer 420 is programmed to repeatedly request 452 at the retry rate that the AtoN transponder 412 transmit the situational report message of the situational report messaging of the addressed messaging until a report acknowledgement for the situational report message. The computer 420 is programmed to accept receipt 453 from the AtoN transponder 412 of the report acknowledgement addressed from the situational awareness terminal to the communication terminal 400.

Figure 5:
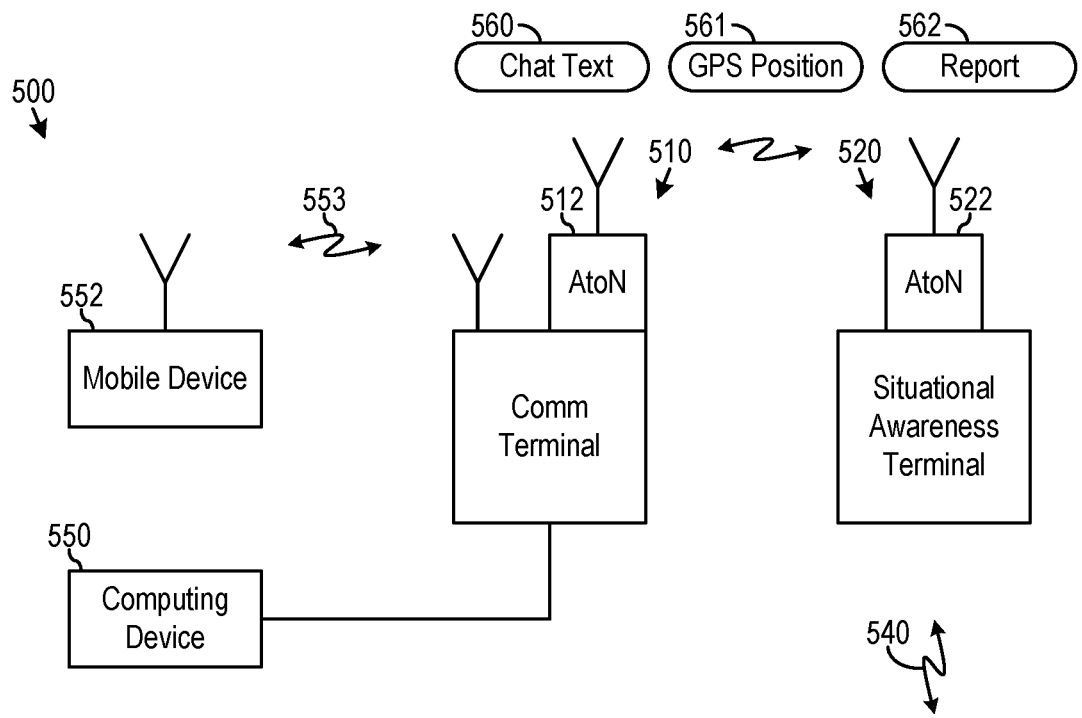
FIG. 5 is a block diagram of a communication system for addressed messaging within an Automated Identification System (AIS) arrangement in accordance with an embodiment of the invention.
Figure 5:
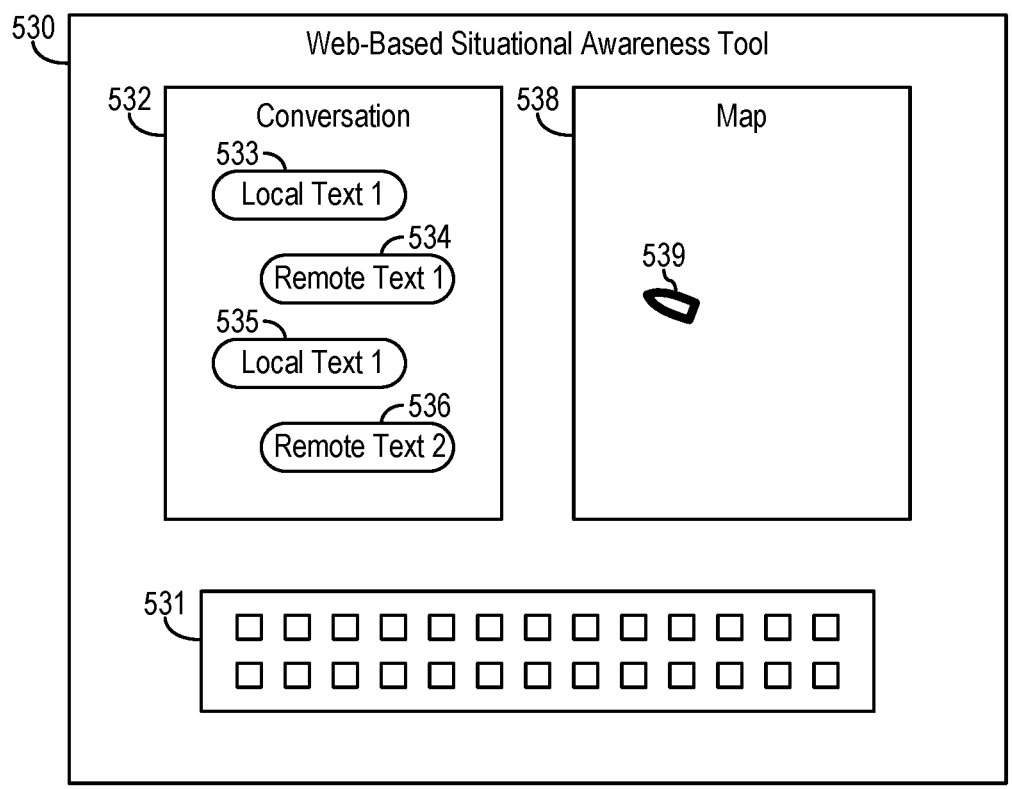

The computer 420 is programmed to synchronize 460 the user interface 410 among the communication terminal 400 and various devices, which include a computing device 550 of FIG. 5 having a wired connection to the computer 420 and a mobile device 552 of FIG. 5 having a wireless connection to the computer 420. The user interface 410 includes a keyboard and a display at each of the devices 400, 550, and 552. Each keyboard is for accepting user entry of outgoing information of the addressed messaging, and the display for showing incoming information and optionally the outgoing information of the addressed messaging.

The computer 420 is programmed to continuously listen 470 for the AtoN transponder 412 to provide the current local GPS position of the AtoN transponder 412. The computer 420 is programmed to repeatedly accept receipt 471 from the AtoN transponder 412 of an incoming position message from the remote terminal that includes the current remote GPS position of the AIS transponder of the remote terminal. The computer 420 is programmed to raise 472 the alert condition at the user interface 410 in response to the current local GPS position of the AtoN transponder 412 of the communication terminal 400 entering into the specified guard area or the current remote GPS position of the AIS transponder of the remote terminal entering into the specified guard area. The alert condition is raised with a visual or audible warning signal, such as injecting an alert notification 280 that is temporally interleaved into any ongoing conversation 240 as shown in FIG. 2.

The computer 420 is programmed to encrypt 480 a data payload within each message of the addressed messaging to inhibit eavesdropping on the chat messaging, the automatic position messaging, and the situational report messaging.

FIG. 5 is a block diagram of a communication system 500 for addressed messaging within an Automated Identification System (AIS) arrangement in accordance with an embodiment of the invention. The communication system 500 includes a communication terminal 510 of the AIS arrangement, a situational awareness terminal 520 of the AIS arrangement, and a web-based situational awareness tool 530.

The communication terminal 510 includes a user interface for facilitating the addressed messaging, which includes chat messaging including chat message 560 addressed between the communication terminal 510 and the situational awareness terminal 520, automatic position messaging including automatic position message 561 addressed from the communication terminal 510 to the situational awareness terminal 520, and situational report messaging including situational report message 562 addressed from the communication terminal 510 to the situational awareness terminal 520. The communication terminal 510 also includes an Aid to Navigation (AtoN) transponder 512 of the AIS arrangement coupled to the user interface for transmitting and receiving that achieves the addressed messaging.

The situational awareness terminal 520 similarly includes a user interface for facilitating the addressed messaging, which includes the chat messaging, the automatic position messaging, and the situational report messaging. The situational awareness terminal 520 also includes an AIS transponder 522 of the AIS arrangement coupled to the user interface for transmitting and receiving that achieves the addressed messaging. Similar to the communication terminal 510, the situational awareness terminal 520 repeatedly requests that the AtoN transponder 522 transmit each chat message 560 from the situational awareness terminal 520 to the communication terminal 510 until an incoming acknowledgement is received from the communication terminal 510 for the chat message 560.

The situational awareness terminal 520 reformats the addressed messaging into reformatted addressed messaging that complies with an Application Programing Interface (API) of the web-based situational awareness tool 530. The situational awareness terminal 520 exchanges the reformatted addressed messaging in both directions between the situational awareness terminal 520 and the web-based situational awareness tool 530 via the internet 540.

The web-based situational awareness tool 530 includes a keyboard 531 and a display. The display shows a conversation 532 and a map 538. The keyboard 531 accepts local texts 533 and 535, which are sent, via the internet 540 and the situational awareness terminal 520, to the communication terminal 510 in the chat messaging of the addressed messaging.

The conversation 532 temporally interleaves the local texts 533 and 535 and remote texts 534 and 536 received from the communication terminal 510 via the situational awareness terminal 520 and the internet 540 in the chat messaging of the addressed messaging.

The map 538 shows an icon 539 for the communication terminal 510 on the map 538 at a current Global Positioning System (GPS) position of the AtoN transponder 512 received from the communication terminal 510 via the situational awareness terminal 520 and the internet 540 in the automatic position messaging of the addressed messaging. A recent history of GPS positions of the AtoN transponder 512 provides an orientation of the icon 539 as shown in FIG. 5. The icon 539 is highlighted as shown when an incident report description from the communication terminal 510 is available at the display. The incident report description is received from the communication terminal 510 via the situational awareness terminal 520 and the internet 540 in the situational report messaging of the addressed messaging.

In one embodiment, the user interface of the communication terminal 510 is synchronized among various devices, which include a computing device 550 having a wired connection to the communication terminal 510 and a mobile device 552 having a wireless connection 553 to the communication terminal 510. The user interface of the communication terminal 510 includes a keyboard and a display at each of the devices 550 and 552. Each keyboard is for accepting user entry of outgoing information of the addressed messaging, and the display is for showing incoming information and optionally the outgoing information of the addressed messaging.

From the above description of Addressed Messaging within an Automated Identification System, it is manifest that various techniques may be used for implementing the concepts of terminals 100, 200, 300, and 400 and system 500 without departing from the scope of the claims. The described embodiments are to be considered in all respects as illustrative and not restrictive. For example, the terminals 100, 200, 300, and 400 are carried on vehicles that are maritime vehicles, land vehicles, and/or aerospace vehicles and the system 500 includes the situational awareness terminal 520 that is a stationary operations center. The terminals 100, 200, 300, and 400 and system 500 disclosed herein may be practiced in the absence of any element that is not specifically claimed and/or disclosed herein. It should also be understood that each of terminals 100, 200, 300, or 400 or system 500 is not limited to the particular embodiments described herein, but is capable of many embodiments without departing from the scope of the claims.

We claim:

1. A communication terminal for addressed messaging within an Automated Identification System (AIS) arrangement, the communication terminal comprising:
a processor;
a user interface for facilitating the addressed messaging, which includes chat messaging addressed between the communication terminal and a participant terminal of the AIS arrangement, automatic position messaging addressed from the communication terminal to a monitoring terminal of the AIS arrangement, and situational report messaging addressed from the communication terminal to a situational awareness terminal of the AIS arrangement; and an Aid to Navigation (AtoN) transponder of the AIS arrangement coupled to the user interface for transmitting and receiving that achieves the addressed messaging;

wherein the AIS complies with a standard denoted Recommendation ITU-R M.1371-5 Technical characteristics for an automatic identification system using time division multiple access in the VHF maritime mobile frequency band;

the communication terminal further comprising a computer coupled to the AtoN transponder and supporting the user interface, the computer programmed to:

display a configuration template of the communication terminal at the user interface, the configuration template for specifying an alert condition and a specified guard area, the alert condition selected from the group consisting of a current local Global Positioning System (GPS) position of the AtoN transponder of the communication terminal entering into the specified guard area and a current remote GPS position of an AIS transponder of a remote terminal entering into the specified guard area;

continuously listen for the AtoN transponder to provide the current local GPS position of the AtoN transponder;

repeatedly accept receipt from the AtoN transponder of an incoming position message from the remote terminal that includes the current remote GPS position of the AIS transponder of the remote terminal; and raise the alert condition at the user interface in response to the current local GPS position of the AtoN transponder of the communication terminal entering into the specified guard area or the current remote GPS position of the AIS transponder of the remote terminal entering into the specified guard area.

2. The communication terminal of claim 1, wherein the AtoN transponder transmits and receives the addressed messaging using message type 6 of the standard with a data payload encrypted to inhibit eavesdropping on the chat messaging, the automatic position messaging, and the situational report messaging.

3. The communication terminal of claim 1, wherein:

the AIS arrangement includes a plurality of terminals each assigned a respective identifier, the terminals including the communication terminal, the participant terminal, the monitoring terminal, and the situational awareness terminal; and the addressed messaging includes a plurality of outgoing messages addressed from the communication terminal to at least one destination terminal of the terminals and a plurality of incoming messages addressed from at least one source terminal of the terminals to the communication terminal, each of the outgoing messages including the respective identifier of the communication terminal and the respective identifier of the destination terminal, and each of the incoming messages including the respective identifier of the source terminal and the respective identifier of the communication terminal.

4. The communication terminal of claim 3, wherein the respective identifier assigned to each of the terminals is a Maritime Mobile Service Identity (MMSI) of the Automated Identification System (AIS), with the MMSI that is assigned to the communication terminal stored in non-transitory memory of the communication terminal.

5. The communication terminal of claim 3, wherein the user interface includes:

a keyboard for accepting a plurality of outgoing texts of those of the outgoing messages for the chat messaging of the addressed messaging; and a display for showing a conversation temporally interleaving the outgoing texts and a plurality of incoming texts from those of the incoming messages for the chat messaging of the addressed messaging.

6. The communication terminal of claim 1, wherein the AtoN transponder includes:

a radio-frequency transceiver for transmitting a plurality of outgoing messages of the addressed messaging and for receiving both a plurality of incoming messages of the addressed messaging and a plurality of broadcast messages, the outgoing messages addressed from the communication terminal and the incoming messages addressed to the communication terminal; and a Global Positioning System (GPS) receiver for measuring a GPS position of the AtoN transponder.

7. The communication terminal of claim 6, wherein the AtoN transponder is configured for transmitting only the outgoing messages and a plurality of outgoing acknowledgements of the incoming messages, such that the AtoN transponder is configured not to transmit any broadcast messages.

8. The communication terminal of claim 1, further comprising a computer coupled to the AtoN transponder and supporting the user interface, the computer programmed to:

synchronize the user interface among the communication terminal and a plurality of devices, which include at least one computing device having a wired connection to the computer and at least one mobile device having a wireless connection to the computer, the user interface including a keyboard and a display at each of the devices, the keyboard for accepting user entry of outgoing information of the addressed messaging, and the display for showing incoming information of the addressed messaging.

9. The communication terminal of claim 1, further comprising a computer coupled to the AtoN transponder and supporting the user interface, the computer programmed to:

display a configuration template of the communication terminal at the user interface, the configuration template for setting a respective identifier of the communication terminal, and for setting a delivery rate and a respective identifier of the monitoring terminal for the automatic position messaging;

at the delivery rate, format an outgoing position message including the respective identifier of the communication terminal, the respective identifier of the monitoring terminal, and a current Global Positioning System (GPS) position received from the AtoN transponder; and at the delivery rate, request that the AtoN transponder transmit the outgoing position message of the automatic position messaging of the addressed messaging.

10. The communication terminal of claim 1, further comprising a computer coupled to the AtoN transponder and supporting the user interface, the computer programmed to:

display a chat view at the user interface, the chat view for selecting the participant terminal from a plurality of known terminals in the AIS arrangement, and for showing a conversation temporally interleaving a plurality of outgoing texts to the participant terminal and a plurality of incoming texts from a plurality of incoming chat messages of the chat messaging of the addressed messaging;

format a plurality of outgoing chat messages addressed to the participant terminal, a respective one of the outgoing chat messages for each outgoing text of the outgoing texts including a respective identifier of the communication terminal, a respective identifier of the participant terminal, and the outgoing text;

request that the AtoN transponder transmit each of the outgoing chat messages of the chat messaging of the addressed messaging;

accept receipt from the AtoN transponder of each of the incoming chat messages addressed from the participant terminal to the communication terminal; and extract from each of the incoming chat messages the respective identifier of the participant terminal and a respective one of the incoming texts.

11. The communication terminal of claim 10, wherein the computer is further programmed to:

repeatedly request that the AtoN transponder transmit each outgoing chat message of the outgoing chat messages until an incoming acknowledgement for the outgoing chat message; and accept receipt from the AtoN transponder of the incoming acknowledgement addressed from the participant terminal to the communication terminal.

12. The communication terminal of claim 1, further comprising a computer coupled to the AtoN transponder and supporting the user interface, the computer programmed to:

display a report view at the user interface, the report view for setting a respective identifier of the situational awareness terminal, and for showing an incident report description during user entry of the incident report description;

format a situational report message addressed to the situational awareness terminal, the situational report message including a respective identifier of the communication terminal, the respective identifier of the situational awareness terminal, and the incident report description;

repeatedly request that the AtoN transponder transmit the situational report message of the situational report messaging of the addressed messaging until a report acknowledgement for the situational report message; and accept receipt from the AtoN transponder of the report acknowledgement addressed from the situational awareness terminal to the communication terminal.

13. The communication terminal of claim 1, wherein the addressed messaging includes the chat messaging, the automatic position messaging, and the situational report messaging.

14. The communication terminal of claim 13, wherein the situational awareness terminal of the AIS arrangement is also the participant terminal of the chat messaging and the monitoring terminal of the automatic position messaging.

15. The communication terminal of claim 13, further comprising a computer coupled to the AtoN transponder and supporting the user interface, the computer programmed to:

display a configuration template of the communication terminal at the user interface, the configuration template for setting a respective identifier of the communication terminal, for setting a delivery rate and a respective identifier of the monitoring terminal for the automatic position messaging, and for setting a retry rate for the chat messaging and the situational report messaging;

at the delivery rate, format an outgoing position message including the respective identifier of the communication terminal, the respective identifier of the monitoring terminal, and a current Global Positioning System (GPS) position received from the AtoN transponder;

at the delivery rate, request that the AtoN transponder transmit the outgoing position message of the automatic position messaging of the addressed messaging;

display a chat view at the user interface, the chat view for selecting the participant terminal from a plurality of known terminals in the AIS arrangement, and for showing a conversation temporally interleaving a plurality of outgoing texts to the participant terminal and a plurality of incoming texts of a plurality of incoming chat messages of the chat messaging of the addressed messaging;

format a plurality of outgoing chat messages addressed to the participant terminal, a respective one of the outgoing chat messages for each outgoing text of the outgoing texts including the respective identifier of the communication terminal, a respective identifier of the participant terminal, and the outgoing text;

at the retry rate, repeatedly request that the AtoN transponder transmit each outgoing chat message of the outgoing chat messages until an incoming acknowledgement for the outgoing chat message of the chat messaging of the addressed messaging;

accept receipt from the AtoN transponder of the incoming acknowledgement addressed from the participant terminal to the communication terminal;

accept receipt from the AtoN transponder of each of the incoming chat messages addressed from the participant terminal to the communication terminal;

extract from each of the incoming chat messages the respective identifier of the participant terminal and a respective one of the incoming texts;

display a report view at the user interface, the report view for setting a respective identifier of the situational awareness terminal, and for showing an incident report description during user entry of the incident report description;

format a situational report message addressed to the situational awareness terminal, the situational report message including the respective identifier of the communication terminal, the respective identifier of the situational awareness terminal, and the incident report description;

at the retry rate, repeatedly request that the AtoN transponder transmit the situational report message of the situational report messaging of the addressed messaging until a report acknowledgement for the situational report message; and accept receipt from the AtoN transponder of the report acknowledgement addressed from the situational awareness terminal to the communication terminal.

16. The communication terminal of claim 15, wherein the AtoN transponder is configured for transmitting each of the outgoing chat messages of the chat messaging, transmitting the outgoing acknowledgement for each of the incoming chat messages of the chat messaging, transmitting the outgoing position message of the automatic position messaging at the delivery rate, and transmitting the situational report message of the situational report messaging, but the AtoN transponder is configured to transmit nothing else.

17. A communication system for addressed messaging within an Automated Identification System (AIS) arrangement, the communication system comprising:
a communication terminal including:
a processor;
a user interface for facilitating the addressed messaging, which includes chat messaging addressed between the communication terminal and a situational awareness terminal of the AIS arrangement, automatic position messaging addressed from the communication terminal to the situational awareness terminal, and situational report messaging addressed from the communication terminal to the situational awareness terminal; and
an Aid to Navigation (AtoN) transponder of the AIS arrangement coupled to the user interface for transmitting and receiving that achieves the addressed messaging; and the situational awareness terminal including: a user interface for facilitating the addressed messaging, which includes the chat messaging, the automatic position messaging, and the situational report messaging; and
an AIS transponder of the AIS arrangement coupled to the user interface for transmitting and receiving that achieves the addressed messaging;
wherein the AIS complies with a standard denoted Recommendation ITU-R M.1371-5 Technical characteristics for an automatic identification system using time division multiple access in the VHF maritime mobile frequency band;
the system further comprising a computer coupled to the AtoN transponder and supporting the user interface, the computer programmed to:
display a configuration template of the communication terminal at the user interface, the configuration template for specifying an alert condition and a specified guard area, the alert condition selected from the group consisting of a current local Global Positioning System (GPS) position of the AtoN transponder of the communication terminal entering into the specified guard area and a current remote GPS position of an AIS transponder of a remote terminal entering into the specified guard area;
continuously listen for the AtoN transponder to provide the current local GPS position of the AtoN transponder;
repeatedly accept receipt from the AtoN transponder of an incoming position message from the remote terminal that includes the current remote GPS position of the AIS transponder of the remote terminal; and
raise the alert condition at the user interface in response to the current local GPS position of the AtoN transponder of the communication terminal entering into the specified guard area or the current remote GPS position of the AIS transponder of the remote terminal entering into the specified guard area.

18. The communication system of claim 17, wherein the situational awareness terminal reformats the addressed messaging into reformatted addressed messaging that complies with an Application Programing Interface (API) of a web-based situational awareness tool, and the situational awareness terminal exchanges the reformatted addressed messaging in both directions between the situational awareness terminal and the web-based situational awareness tool via the internet.

19. The communication system of claim 18, further comprising the web-based situational awareness tool, wherein the web-based situational awareness tool includes:
a keyboard for accepting a plurality of local texts sent via the internet and the situational awareness terminal to the communication terminal in the chat messaging of the addressed messaging; and
a display for showing:
a conversation temporally interleaving the local texts and a plurality of remote texts received from the communication terminal via the situational awareness terminal and the internet in the chat messaging of the addressed messaging, and
a map showing an icon for the communication terminal on the map at a current Global Positioning System (GPS) position of the AtoN transponder received from the communication terminal via the situational awareness terminal and the internet in the automatic position messaging of the addressed messaging, the icon highlighted when an incident report description for the communication terminal is available at the display, the incident report description received from the communication terminal via the situational awareness terminal and the internet in the situational report messaging of the addressed messaging.

\* \* \* \* \*